(12) United States Patent
Carolan

(10) Patent No.: US 7,702,283 B2
(45) Date of Patent: Apr. 20, 2010

(54) METHOD FOR REDUCING ELECTROMAGNETIC EMISSIONS IN A MULTIPLE MICRO-CONTROLLER DEVICE

(75) Inventor: Kevin M. Carolan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 530 days.

(21) Appl. No.: 11/239,575

(22) Filed: Sep. 29, 2005

(65) Prior Publication Data
US 2007/0072549 A1 Mar. 29, 2007

(51) Int. Cl.
H04B 1/00 (2006.01)
H04B 1/10 (2006.01)
G06F 15/76 (2006.01)

(52) U.S. Cl. .................. 455/63.1; 455/296; 712/32; 712/33; 712/34

(58) Field of Classification Search .......... 101/2; 455/63.1, 63.3, 454, 114.2, 69, 296; 701/33; 712/247, 32, 33, 34
See application file for complete search history.

(56) References Cited

U.S. PATENT DOCUMENTS

| | | | |
|---|---|---|---|
| 5,399,996 A | 3/1995 | Yates et al. | 331/74 |
| 5,442,774 A * | 8/1995 | Pickup et al. | 713/501 |
| 6,377,764 B1 | 4/2002 | Morris-jones | 399/75 |
| 6,404,834 B1 * | 6/2002 | Hardin et al. | 375/376 |
| 6,604,803 B1 * | 8/2003 | Hanabusa et al. | 347/14 |
| 6,804,304 B1 | 10/2004 | Chan | 375/257 |
| 2003/0035388 A1 * | 2/2003 | Schmidt | 370/329 |
| 2005/0056177 A1 * | 3/2005 | Silverbrook | 101/424.1 |
| 2006/0059377 A1 * | 3/2006 | Sherburne, Jr. | 713/300 |
| 2007/0009067 A1 * | 1/2007 | Michalak | 375/346 |
| 2007/0067605 A1 * | 3/2007 | Chang | 712/10 |

OTHER PUBLICATIONS

"P89LPC932A1 8-bit microcontroller with accelerated two-clock 80C51 core 8 kB 3 V byte-erasable flash with 512-byte data EEPROM"—Product data sheet, Rev. 02—May 10, 2005, koninkklijke Phillips Electronics N.V. 2005, 64 pages.

"Electromagnetic Emissions of Integrated Circuits" Leonardo Da Vinci, European Union Programme on Vocational Training, Last updated Jul. 8, 2001, 16 pages.

"Oscillators for Microcontrollers" by Tom Williamson, Microcontroller, Technical Marketing, INTEL Corporation, 2200 Mission College Blvd., Santa Clara, CA 95052, dtd. Jun. 1983.

* cited by examiner

*Primary Examiner*—Nick Corsaro
*Assistant Examiner*—Shannon R Brooks
(74) *Attorney, Agent, or Firm*—Alix, Yale & Ristas, LLP

(57) ABSTRACT

A method for reducing electromagnetic emissions in an electronic device having a multiple micro-controllers includes identifying the number of micro-controllers installed in the electronic device. An operating frequency range of the electronic device is determined based on the operating frequency range of each micro-controller. A frequency spacing for each micro-controller within the operating frequency range of the electronic device is then calculated, and an operating frequency is assigned to each micro-controller. The operating frequency of each micro-controller is separated from the operating frequency of each other micro-controller by at least the frequency spacing. Then, the operating frequency of each micro-controller is set at the assigned operating frequency.

14 Claims, 5 Drawing Sheets

METHOD FOR REDUCING ELECTROMAGNETIC EMISSIONS IN A MULTIPLE MICRO-CONTROLLER DEVICE

BACKGROUND

This disclosure relates generally to electromagnetic emissions. More particularly, the present disclosure relates to a method for minimizing electromagnetic emissions.

Electromagnetic Compatibility (EMC) has two aspects. Voltage and current variations in an electronic circuit cause electromagnetic fields to be generated all around the equipment. Such emissions from electronic equipment have to be compliant with limits defined in a national and international EMC standards. In addition, electronic systems have to function in an electromagnetically polluted environment. Wires and printed circuit board traces act as antennas for transmitting and receiving electromagnetic signals. Electromagnetic interference that is captured by such antenna is translated into voltages and currents which are superimposed on system signals. Such interference could induce system failures.

Electromagnetic Compatibility is an important phase that must be completed before releasing any high-speed digitally-clocked products. Passing EMC tests of the FCC, CISPR, and other regulatory agencies usually dictates a significant portion of the digital design, as well as the circuit board layout. Known methods for achieving EMC involve adding shielding components, or they may even involve totally redesigning the circuit.

SUMMARY

There is provided a method for reducing electromagnetic emissions in an electronic device having a multiple micro-controllers. The method comprises identifying the number of micro-controllers installed in the electronic device. An operating frequency range of the electronic device is determined based on the operating frequency range of each micro-controller. A frequency spacing for each micro-controller within the operating frequency range of the electronic device is then calculated, and an operating frequency is assigned to each micro-controller. The operating frequency of each micro-controller is separated from the operating frequency of each other micro-controller by at least the frequency spacing. Then, the operating frequency of each micro-controller is set at the assigned operating frequency.

The method also comprises maintaining the frequency of each micro-controller at the assigned operating frequency. The frequency is maintained by transmitting a synchronization pulse from a master controller of the electronic device to each micro-controller and calibrating an oscillator on each micro-controller to the synchronization pulse. A baud rate divider of each micro-controller may be adjusted after the oscillator has been calibrated to the synchronization pulse.

Determining the operating frequency range of the electronic device comprises determining if the micro-controllers of the electronic device are substantially identical. If all of the micro-controllers of the electronic device are substantially identical, the operating frequency range of the micro-controllers is set as the operating frequency range of the electronic device. If all of the micro-controllers of the electronic device are not substantially identical, the micro-controllers having the frequency range with the lowest and highest frequency are identified. The lowest frequency is set as a bottom of the operating frequency range of the electronic device and the highest frequency is set as the top of the operating frequency range of the electronic device.

There is also provided a digital printing apparatus comprising a main module including a main control board and at least one ancillary module including a control board. The main control board and the control board of the ancillary module each have at least one micro-controller. Each micro-controller of the digital printing apparatus has an operating frequency that is not equal to the operating frequency of each other micro-controller of the digital printing apparatus.

The operating frequency of each of the micro-controllers of the digital printing apparatus is separated from the operating frequency of each other of the micro-controllers of the digital printing apparatus by a frequency spacing substantially equal to the digital printing apparatus operating frequency range divided by the number of micro-controllers. The frequency spacing is at least 150 kHz.

The main control board also has a synchronization pulse transmitter. Each micro-controller of each ancillary module calibrates the operating frequency of the micro-controller to the synchronization pulse.

There is further provided an electronic device comprising at least two micro-controllers. Each micro-controller has an operating frequency that is not equal to the operating frequency of each other micro-controller of the electronic device.

The operating frequency of each of the micro-controllers of the electronic device is separated from the operating frequency of each other of the micro-controllers of the electronic device by a frequency spacing substantially equal to the electronic device operating frequency range divided by the number of micro-controllers. The frequency spacing is at least 150 kHz.

One of the micro-controllers of the electronic device has a synchronization pulse transmitter. Each other of the micro-controllers calibrates the operating frequency of the micro-controller to the synchronization pulse.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

With reference to the drawings wherein like numerals represent like parts throughout the several figures, a method for reducing electromagnetic emissions in a multiple micro-controller system in accordance with the present disclosure is generally designated by the numeral 10.

Figure 1:
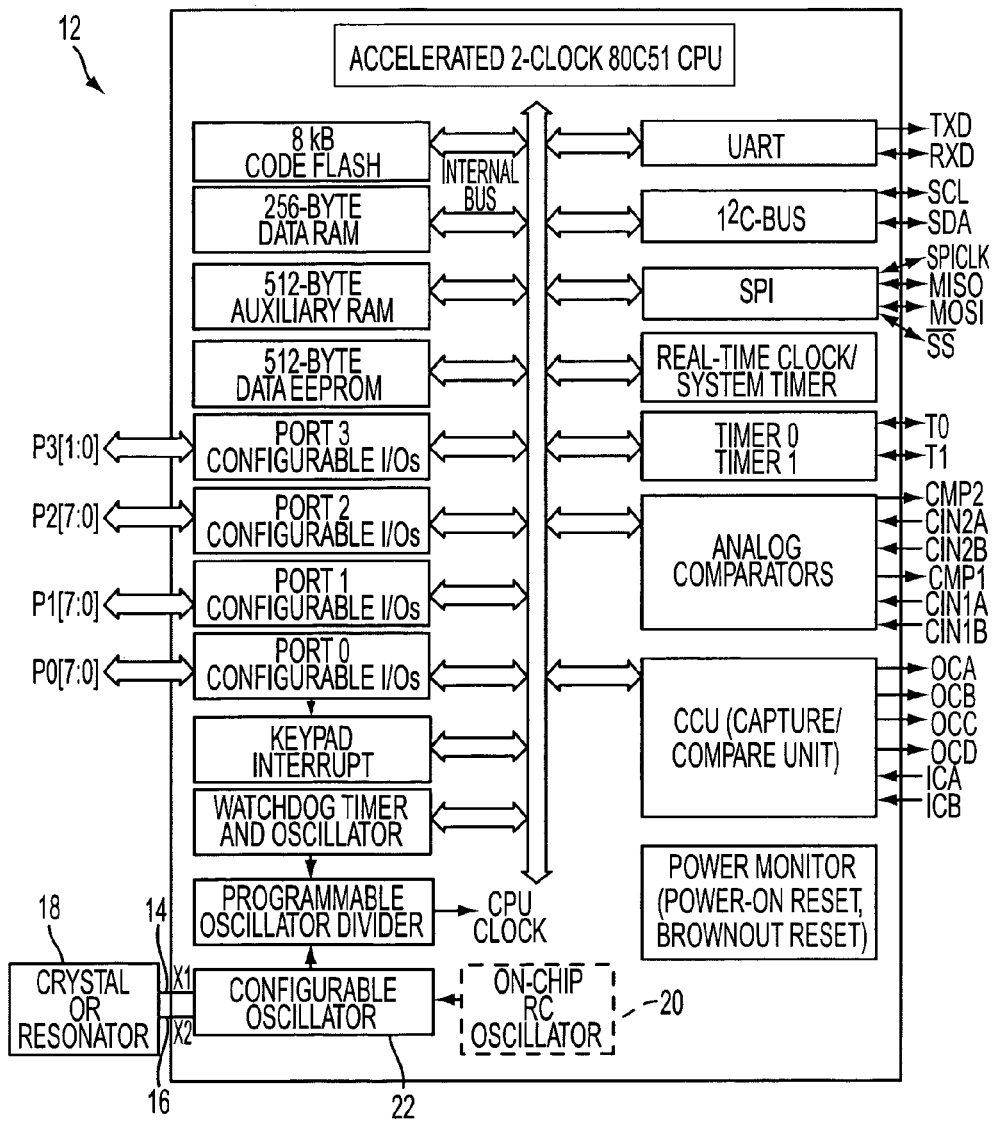
FIG. 1 is a block diagram of a conventional micro-controller.
Figure 2:
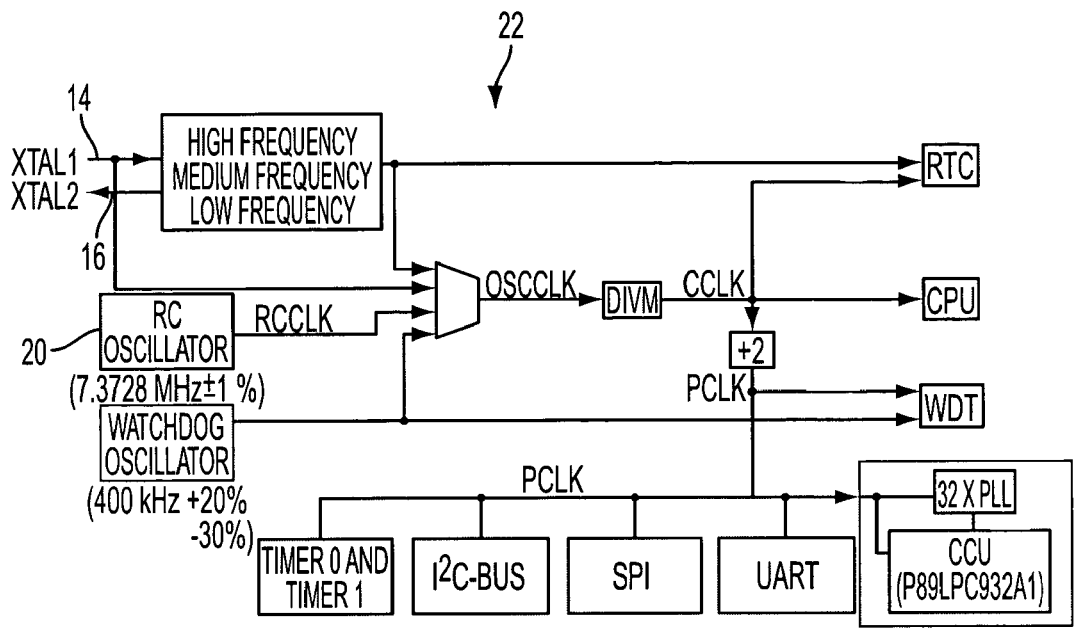
FIG. 2 is a functional block diagram of a conventional on-board oscillator control for the micro-controller of FIG. 1.
Figure 3:
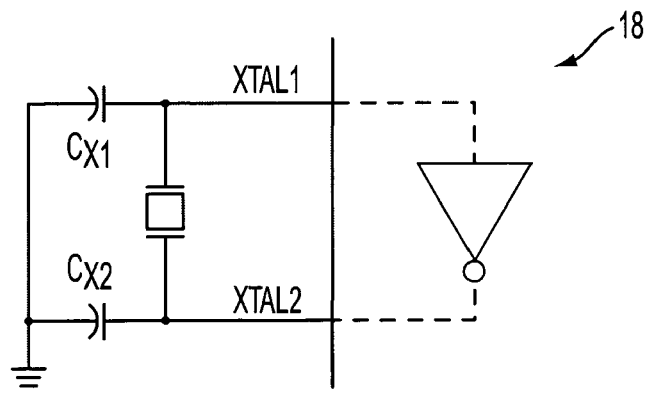
FIG. 3 is a schematic diagram of a simple conventional off-board oscillator control for the micro-controller of FIG. 1.

With reference to FIGS. 1-3, conventional micro-controllers 12 generally include provisions for selecting the clock source. As shown in FIG. 1, the micro-controller 12 has either input/output pins 14, 16 for connection to an external crystal/resonator 18, or an on-board oscillator 20. The on-board oscillator 20 may be found on newer design micro-controllers 12, such as the Philips P89LPC932A1 8-bit micro-controller. Older design micro-controllers 12, such as the Intel MCS®-48, MCS®-51, and iACX-96™ micro-controllers, include input/output pins (XTAL1, XTAL2) 14, 16 for connecting the micro-controller 12 to the external crystal/resonator 18, and an on-board configurable oscillator 22 that acts as an amplifier.

Figure 4:
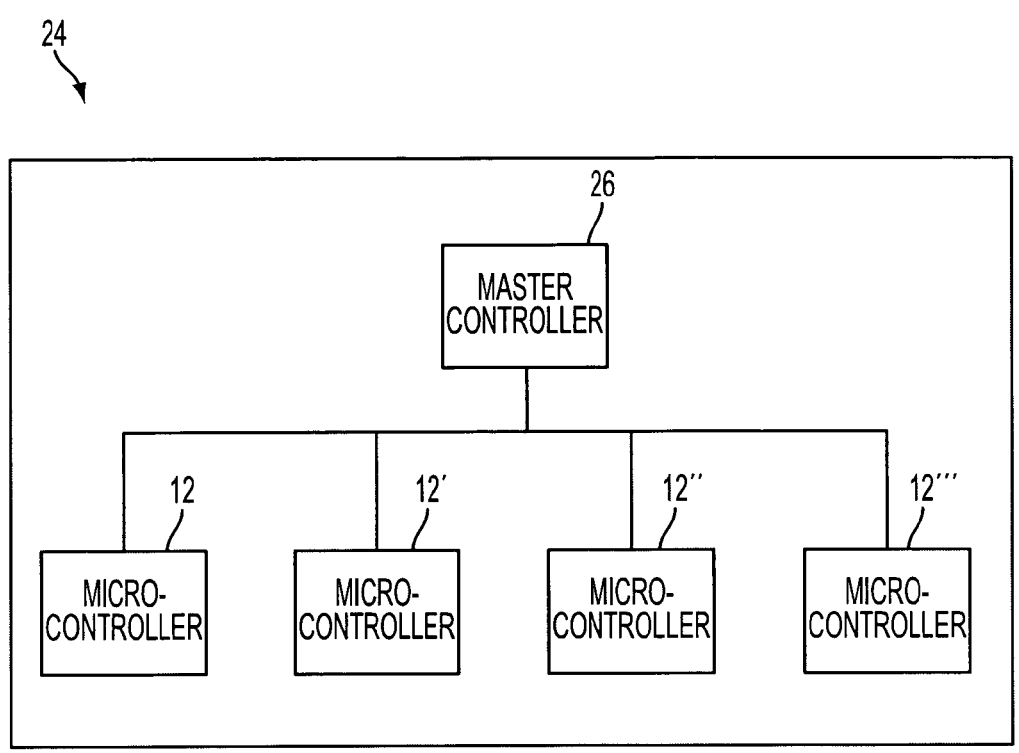
FIG. 4 is a schematic diagram of an electronic device utilizing a method for reducing electromagnetic emissions in a multiple micro-controller system.
Figure 5:
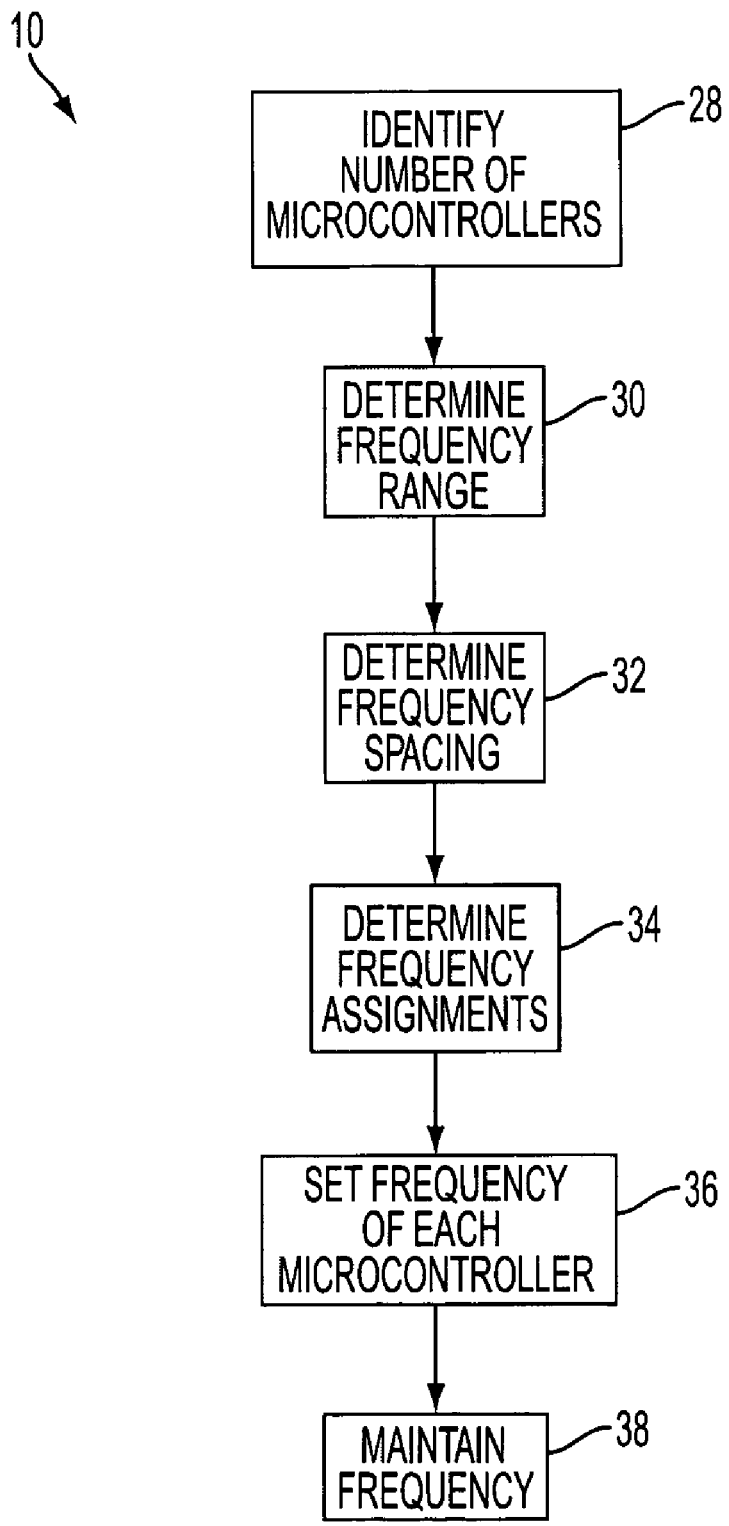
FIG. 5 is a flow diagram of a method for reducing electromagnetic emissions in a multiple micro-controller system.

With reference to FIGS. 4 and 5, an electronic device 24 utilizing the subject method for reducing electromagnetic emissions includes multiple micro-controllers 12, 12', 12", 12"', having a unique identification (ID) for communication with a master controller 26. To minimize the level of electromagnetic energy transmitted at a specific frequency, the frequency of each micro-controller 12, 12', 12", 12"' in the device 24 is set at a different frequency within the frequency band allowed by the micro-controllers 12, 12', 12", 12"'. To facilitate discussion, each micro-controller 12, 12', 12", 12"' in the device 24 will be considered to be substantially identical to each other micro-controller 12, 12', 12", 12"' in the device 24. It should be appreciated that the operating frequencies of dissimilar micro-controllers may also be determined and set in the same manner.

To provide the greatest degree of separation between the emission frequencies of the micro-controllers 12, 12', 12", 12"', the micro-controllers 12, 12', 12", 12"' are assigned frequencies that are evenly spaced over the available frequency range for the micro-controllers 12, 12', 12", 12"'. To do this, the number of micro-controllers 12, 12', 12", 12"' installed in the device 24 may identified 28 during the manufacture of the device 24 or by the master controller 26 during initial setup. The frequency range that is available is determined 30. It should be appreciated that for a device 24 having identical micro-controllers 12, 12', 12", 12"', this frequency range will be the range of adjustment available to the micro-controller. For a device 24 having one or more different micro-controllers 12, 12', 12", 12"', the available frequency range of each micro-controller 12, 12', 12", 12"' must be considered.

The number of micro-controllers 12, 12', 12", 12"' is divided into the available frequency range to provide 32 the frequency spacing for the micro-controllers 12, 12', 12", 12"'. The specific frequency assignments are calculated 34 by simple addition or subtraction. If a first micro-controller 12 is assigned a frequency at the lower end of the frequency range, the frequency assignments for each subsequent micro-controller 12', 12", 12"' may be determined by merely adding the frequency spacing to the assigned frequency of the first micro-controller 12. Conversely, if the first micro-controller 12 is assigned a frequency at the upper end of the frequency range, the frequency assignments for each subsequent micro-controller 12', 12", 12"' may be determined by merely subtracting the frequency spacing to the assigned frequency of the first micro-controller 12. In devices 24 having different types of micro-controllers 12, 12', 12", 12"', the specific frequency assignments may have to be adjusted if the assigned frequency for a micro-controller 12, 12', 12", 12"' falls outside of the range of adjustment for the micro-controller 12, 12', 12", 12"'. The frequency of each micro-controller is then set 36 to one of the assigned frequencies.

The master controller transmits a synchronization pulse to each micro-controller 12, 12', 12", 12"' of the device. This allows each of the micro-controllers to calibrate 38 its oscillator to the synchronization pulse, to prevent drifting of the micro-controller operating frequency from the assigned frequency. The ID and the synchronization pulse may also be used by an algorithm to adjust the baud rate divider once each oscillator frequency has been adjusted.

Figure 6:
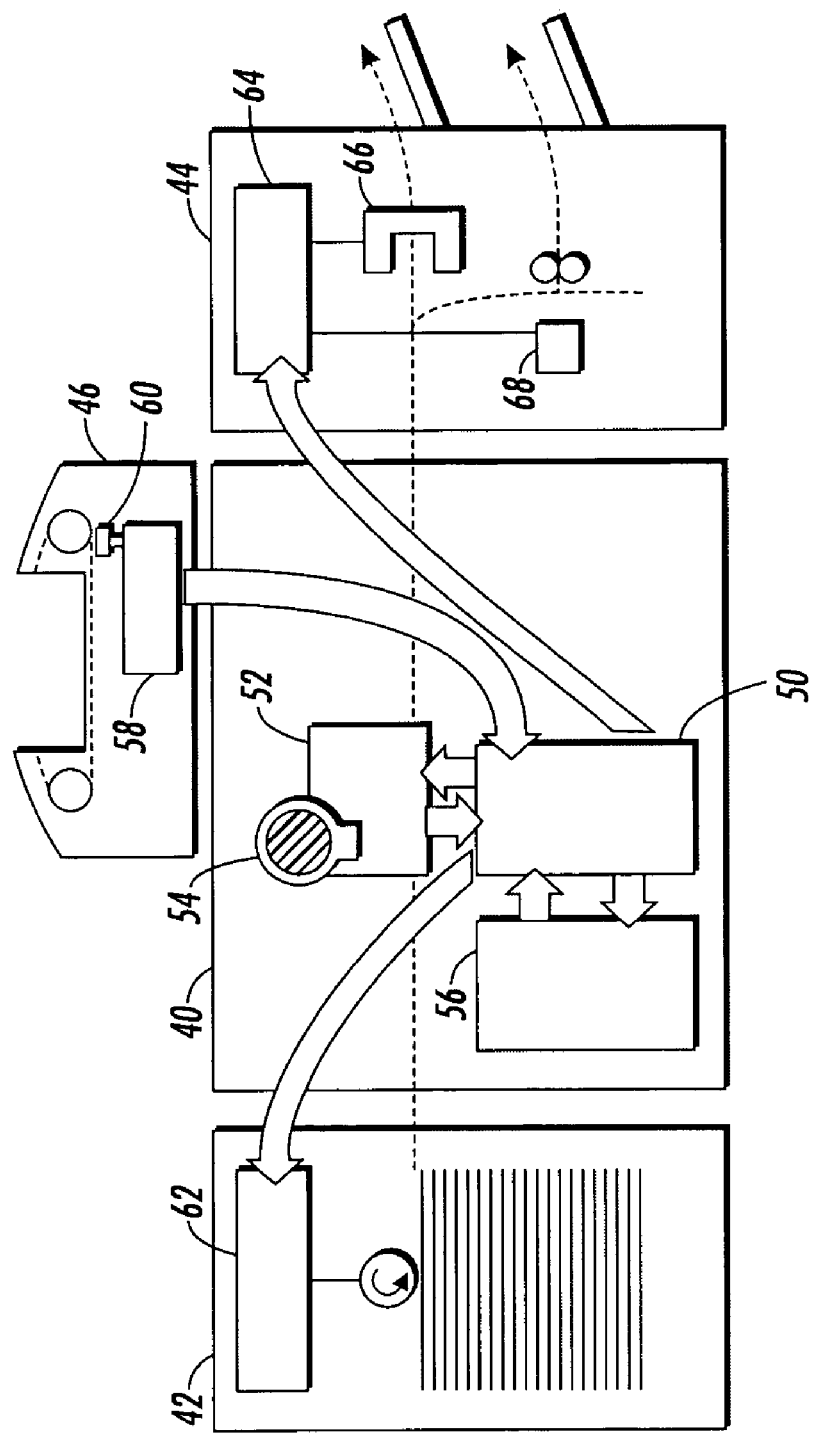
FIG. 6 is a simplified elevational view of a digital printing apparatus having multiple micro-controllers utilizing the method for reducing electromagnetic emissions.

With reference to FIG. 6, a digital printing apparatus having a main body or main module generally indicated as 40 may further have associated therewith various substitutable ancillary modules, such as a separate paper supply module 42 or a finisher module 44, as well as a separable input scanner 46. As defined herein, a module is an entity which performs some physical function, such as putting marks on a sheet, feeding a sheet, scanning a sheet, or stapling a sheet. In a typical arrangement of office equipment, the main body 40 includes the print engine, which is the set of software and hardware which places marks on sheets to result in prints.

Exercising general control over an entire system is preferably a main control board 50. As defined herein, a board is set of hardware and software which controls a module. Typically, a board is simply a circuit board, such as including a microprocessor or other chips, along with software which operates on the board; however, according to the present definition, a board may physically include multiple boards, or be formed in only a portion of a larger circuit board. Foremost among auxiliary modules controlled by main control board 50 is the print engine 52, which may be of any basic type known in the art, such as a xerographic "laser printer" apparatus, an ink jet device, or some equivalent.

The important attribute of print engine 52 is that it places marks on sheets passing therethrough in accordance with processed digital image data. As used herein, the word data shall generally apply to any type of data, particularly control data and image data. Control data is data which is either directly operative of hardware, or which results from an event experienced by hardware; for example, a pulse which causes a motor to draw a sheet from a stack is control data, as well as a signal which results when and a sensor detects a paper jam. In contrast, image data is data at which is symbolic of an image which is either recorded or which can be printed. As used herein, processed image data shall be defined as image data in a form which is substantially directly operative of a marking device, such as an ink jet printhead or a laser used in an electrophotographic apparatus. Print engine 52 may further have associated therewith specialized paper feeding apparatus (not shown), such as a duplexing device, paper jam detectors, as well as provision for accepting paper feed signals, etc. Print engine 52 includes therein a print engine control board which converts control data and image data to operate the hardware therein (the print engine control board is not discretely shown in the Figure, as it is typical that such a board is integral to any design of a print engine that accepts digital data). Print engine 52 may also have associated therewith a removable marking material supply, such as shown as 54, which may be in the form of a supply of toner or liquid ink of various colors. The print engine control board may have means for determining, either by direct measurement or inferred by a cumulative use, the amount of marking material associated with supply 54 at any given time. Indeed, the marking material supply 54 may itself have associated therewith a board which can interact with other boards within the apparatus.

One source of image data to be supplied to print engine 52 under the control of main control board 50 is what is here called an image processing board 56. Specifically, image processing board 56 may include one or more decomposers, or interpreters, meaning software which converts image data it receives into a form immediately usable by print engine 52; that is, the image processing board 56 receives digital image data and outputs processed digital image data. Typical examples of digital image data to be received by image processing board 56 include data in known page description languages, as well as other highly structured formats such as TIFF or facsimile formats. Depending on the particular design of the equipment, processed image data output from image processing board 56 may be transferred directly to the board within print engine 52, or be routed through main control board 50.

Another possible source of image data for outputting by print engine 52 is original hard copy images. Such hard copy images can be fed through a scanner 46, of a general design which is known in the art. For purposes of describing the present invention, the scanner 46 may include a scanner control board indicated as 58. Depending on the specific design of the apparatus, scanner control board 58 may include provisions for controlling the various motors for feeding the original sheets in series, and/or processing original data recorded by a photosensor such as indicated as 60. Original image data collected by input scanner control board 58 is eventually directed to main control board 50 for placing in a form which is acceptable to print engine 52, such as to create digital copies of the original images from scanner 46.

Blank sheets on which images are to be printed by the print engine 52 can be stacked in one or more paper supply modules such as 42, which will feed individual sheets to the print engine 52 when instructed to do so by main control board 50. In a highly modular design of office equipment, a paper supply module 42 may include therein a supply module board 62, which is designed to be a operated by the main control board 50 when a particular module 42 is installed relative to the main portion: indeed, in a high-speed system, it is typical to have numerous supply modules 42 be selectably available as different types of input sheets, of different sizes, weights, or colors. Alternately, such control data for drawing and feeding sheets may come from the print engine control board within print engine 52.

After sheets are printed with images by print engine 52, the print sheets are then directed to one or more finisher modules such as 44. Each finisher module 44 may have included therein a finisher control board such as 64, which in turn directly controls finisher hardware for performing finisher operations on sheets received in the module 44. Typical among these types of finisher hardware are a stapler 66 or a folding device 68. Another popular option for advanced finishing equipment is to provide multiple output trays or mailboxes (not shown), to which different sets of sheets are directed depending on the identity of the person ordering the print job. Signals to cause various parts of a finisher module 44 to perform various functions may originate within main control board 50 or from the print engine control board within print engine 52, and are sent to finisher control board 64.

In the example of FIG. 6, the digital printing apparatus includes three modules, and may have as many as seven (7) boards/control boards. Each of these boards/control boards may include one or more micro-controller 12. When the method taught above is applied to the subject digital printing apparatus, the number of micro-controllers 12 installed in the digital printing apparatus is identified 28 and the frequency range that is available is determined 30. The number of micro-controllers 12 is divided into the available frequency range to provide 32 the frequency spacing for the micro-controllers 12. The specific frequency assignments are calculated 34 and each micro-controller 12 is set 36 to one of the assigned frequencies. Over the operating life of the digital printing apparatus, the main control board 50 transmits a synchronization pulse to each micro-controller 12 of the digital printing apparatus, to allow the micro-controllers to calibrate 38 their oscillators to prevent drifting of the micro-controller operating frequency from the assigned frequency.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for reducing electromagnetic emissions in an electronic device having a plurality of micro-controllers, each of the micro-controllers having an operating frequency range, the method comprising:
   identifying the number of micro-controllers installed in the electronic device;
   determining an operating frequency range of the electronic device associated with the operating frequency range of each micro-controller;
   determining a frequency spacing for each micro-controller within the operating frequency range of the electronic device;
   assigning an operating frequency for each micro-controller, the operating frequency of each micro-controller being separated from the operating frequency of each other micro-controller by at least the frequency spacing; and
   setting the operating frequency of each micro-controller at the assigned operating frequency.

2. The method of claim 1 further comprising maintaining the frequency of each micro-controller at the assigned operating frequency.

3. The method of claim 2 wherein maintaining the frequency of each micro-controller at the assigned operating frequency comprises:
   transmitting a synchronization pulse from a master controller of the electronic device to each micro-controller; and
   calibrating an oscillator of each micro-controller to the synchronization pulse.

4. The method of claim 3 wherein maintaining the frequency of each micro-controller at the assigned operating frequency further comprises adjusting a baud rate divider of each micro-controller after the oscillator has been calibrated to the synchronization pulse.

5. The method of claim 1 wherein determining the operating frequency range of the electronic device comprises:
   determining if the micro-controllers of the electronic device are substantially identical; and
   setting the operating frequency range of the micro-controllers as the operating frequency range of the electronic device, if all of the micro-controllers of the electronic device are substantially identical.

6. The method of claim 5 wherein if all of the micro-controllers of the electronic device are not substantially identical, determining the operating frequency range of the electronic device comprises:
   identifying the micro-controller having the frequency range with a lowest frequency;
   identifying the micro-controller having the frequency range with a highest frequency; and
   setting the lowest frequency as a bottom of the operating frequency range of the electronic device and the highest frequency as the top of the operating frequency range of the electronic device.

7. The method of claim 1 wherein determining the frequency spacing comprises dividing the number of micro-controllers into the operating frequency range of the electronic device.

8. The method of claim 7 wherein the frequency spacing is at least 150 KHz.

9. The method of claim 1 wherein assigning the operating frequency of each micro-controller comprises:
(A) assigning a bottom of the operating frequency range of the electronic device to a first micro-controller;
(B) adding the frequency spacing to the assigned frequency of the first micro-controller to define a subsequent assigned frequency;
(C) assigning the subsequent assigned frequency to a subsequent micro-controller to redefine the subsequent assigned frequency as a prior assigned frequency;
(D) adding the frequency spacing to the prior assigned frequency to define a subsequent assigned frequency; and
(E) repeating (C) and (D) until each micro-processor has been assigned an operating frequency.

10. The method of claim 1 wherein assigning the operating frequency of each micro-controller comprises:
(A) assigning a top of the operating frequency range of the electronic device to a first micro-controller;
(B) subtracting the frequency spacing from the assigned frequency of the first micro-controller to define a subsequent assigned frequency;
(C) assigning the subsequent assigned frequency to a subsequent micro-controller to redefine the subsequent assigned frequency as a prior assigned frequency;
(D) subtracting the frequency spacing from the prior assigned frequency to define a subsequent assigned frequency; and
(E) repeating (C) and (D) until each micro-processor has been assigned an operating frequency.

11. A method for reducing electromagnetic emissions in an electronic device having a plurality of substantially identical micro-controllers having an operating frequency range, the method comprising:
identifying the number of micro-controllers installed in the electronic device;
assigning the operating frequency of the micro-controllers as an operating frequency range of the electronic device;
dividing the number of micro-controllers into the operating frequency range of the electronic device to determine a frequency spacing for each micro-controller;
assigning an operating frequency for each micro-controller, the operating frequency of each micro-controller being separated from the operating frequency of each other micro-controller by substantially the frequency spacing;
setting the operating frequency of each micro-controller at the assigned operating frequency; and
maintaining the frequency of each micro-controller at the assigned operating frequency.

12. The method of claim 11 wherein maintaining the frequency of each micro-controller at the assigned operating frequency comprises:
transmitting a synchronization pulse from a master controller of the electronic device to each micro-controller; and
calibrating an oscillator of each micro-controller to the synchronization pulse.

13. The method of claim 12 wherein maintaining the frequency of each micro-controller at the assigned operating frequency further comprises adjusting a baud rate divider of each micro-controller after the oscillator has been calibrated to the synchronization pulse.

14. The method of claim 11 wherein the frequency spacing is at least 150 KHz.

* * * * *